US006812992B2

(12) United States Patent
Nemeth

(10) Patent No.: US 6,812,992 B2
(45) Date of Patent: Nov. 2, 2004

(54) PHOTO ABLATION TO RESOLVE "BRIGHT ON" PIXEL DEFECTS IN A NORMALLY WHITE LCD

(75) Inventor: Paul R. Nemeth, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 281 days.

(21) Appl. No.: 09/770,854

(22) Filed: Jan. 26, 2001

(65) Prior Publication Data

US 2002/0101558 A1 Aug. 1, 2002

(51) Int. Cl.[7] .......................... G02F 1/13; G02F 1/1335
(52) U.S. Cl. ........................................ 349/192; 349/106
(58) Field of Search .................................. 349/106, 192

(56) References Cited

U.S. PATENT DOCUMENTS 5,142,386 A * 8/1992 Ishihara ...................... 349/192
5,531,881 A * 7/1996 Matsumura et al. ........ 204/507
5,926,246 A * 7/1999 Tomita et al. .............. 349/192

FOREIGN PATENT DOCUMENTS

| JP | 5-27111 | * | 2/1993 |
| JP | 09-005732 | * | 1/1997 |
| JP | 9-152568 | * | 6/1997 |

* cited by examiner

Primary Examiner—Tarifur R. Chowdhury
(74) Attorney, Agent, or Firm—Nathan O. Jensen; Kyle Eppele

(57) ABSTRACT

A technique is provided to resolve "bright on" pixels defects in a normally white liquid crystal display. A laser operating with a wavelength in the visible range permits the ablation of material coated or adhered to a glass substrate of the liquid crystal display without causing thermal or mechanical damage to the glass substrate. The laser is used to darken the defective pixel by focusing on color filter of the defective pixel. After a portion of the color filter is darkened, a minor defect exists.

20 Claims, 3 Drawing Sheets

PHOTO ABLATION TO RESOLVE "BRIGHT ON" PIXEL DEFECTS IN A NORMALLY WHITE LCD

FIELD OF THE INVENTION

The present invention relates to liquid crystal displays. More particularly, the invention relates to a technique for resolving major defects in a normally white liquid crystal display.

BACKGROUND OF THE INVENTION

Liquid crystal displays (LCDs) are used in a variety of different applications. For example, LCDs are used in laptop computers, hand-held devices, cellular phones, coordinate location systems and vehicle displays. One type of an LCD is a normally white LCD. Pixels in normally white LCDs will be non-transmissive when power is applied to the pixel when driven black. Pixels that remain transmissive when power is applied are defective and known as "electrically open" or "bright on" pixel defects. When these defects occur in quantity, there is reason for a quality rejection of the LCD.

Most users of LCDs will permit some quantity of defects. However, a "bright on" defect is considered a "major" type defect (compared to an electrically shorted pixel or partially shorted pixel, which are considered minor defects). Technology currently exists to reduce the adverse impact of a bright on pixel in a "normally black" LCD (caused by an electrical short) and, depending on the thin film transistor (TFT) structure, in some normally white LCDs. Using this technology, when electrical shorts are detected in a normally black LCD, a laser is used to isolate the circuit from the bus line on the TFT substrate. This technology, however, will not work for all normally white LCDs, and in particular will not work for normally white LCDs in which the bright on defect is caused by an open circuit. Thus, improvements are necessary to develop techniques to resolve "bright on" pixel defects in a normally white LCD.

SUMMARY OF THE INVENTION

A technique is provided to resolve "bright on" pixels defects in a normally white LCD. A laser operating with a 780–840 nm wavelength in the visible range permits the ablation of the pigmented color filter material coated or adhered to a glass substrate of the LCD without causing thermal or mechanical damage to the glass substrate. The laser is used to darken the defective pixel by focusing on a color filter of the defective pixel. After a portion of the color filter is darkened, a minor defect exists instead of a major defect.

DETAILED DESCRIPTION OF AN ILLUSTRATIVE EMBODIMENT

Figure 1:
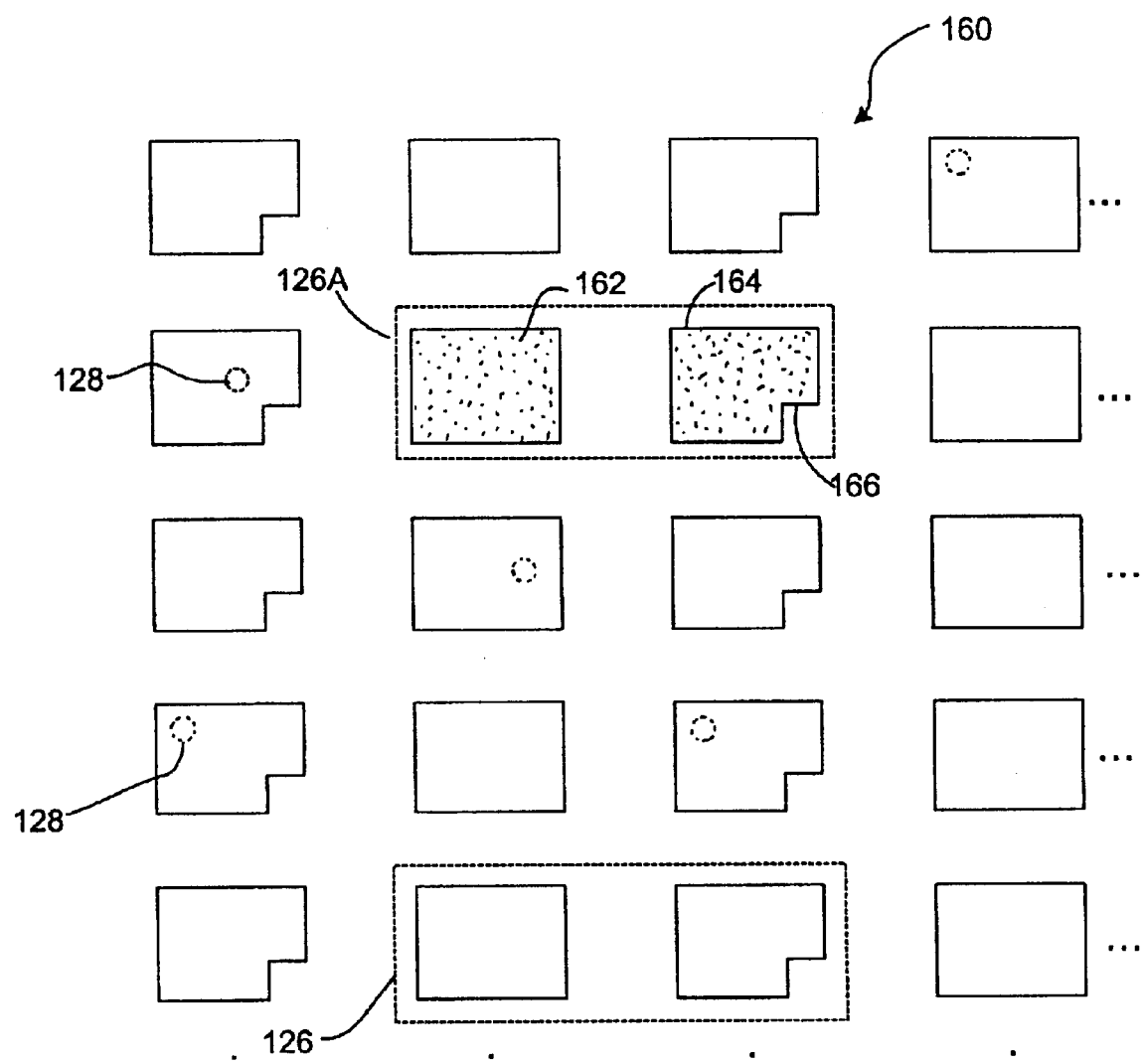
FIG. 1 illustrates an exemplary schematic representation of pixels in a normally white LCD.

FIG. 1 illustrates an exemplary schematic representation of pixels in a portion of a normally white LCD. LCD 160 contains a plurality of pixels 126 and spacer beads 128. As is known in the art, spacer beads 128 are typically 4–5 microns in diameter and are used to separate and support glass substrates (discussed in FIG. 3) of the liquid crystal display 160.

Pixels 126, by way of example, are comprised of two rectangular portions 162 and 164 with one portion having a notched corner 166. Other pixels are similarly constructed. Persons skilled in the art will appreciate that a number of different shapes and sizes can be used as pixels 126 in LCD 160, and that the pixels can be divided into any number of portions. Typically, pixels are either colored red, green or blue. The color of a pixel element is established using a corresponding portion of a color filter (shown in greater detail in FIG. 3) associated with or forming part of the pixel. Varying intensities of transmissivity through pixel voltage control can create different colors tones visible to the user, and combining pixels can be used to generate different colors or gray scales.

Pixel 126A is illustrated as a defective pixel which is electrically open, thus always allowing light to pass through. Other pixels of LCD 160 can be driven black and thus are not always transmissive of light. The defective pixel 126A in LCD 160 remains transmissive when power is applied to LCD 160 and is often referred to as an electrically open or "bright on" pixel defect. Thus, when power is applied to the liquid crystal display, non-defective pixels may be driven black while defective pixels, such as pixel 126A, remain electrically open and in a transmissive state, exhibiting that particular pixel's specular color. The defect can be a result of a malfunction in the thin film transistor layer (discussed in FIG. 3). In order to resolve defects of this type in a normally white liquid crystal display, an ablation technique is used in accordance with the invention.

Figure 2:
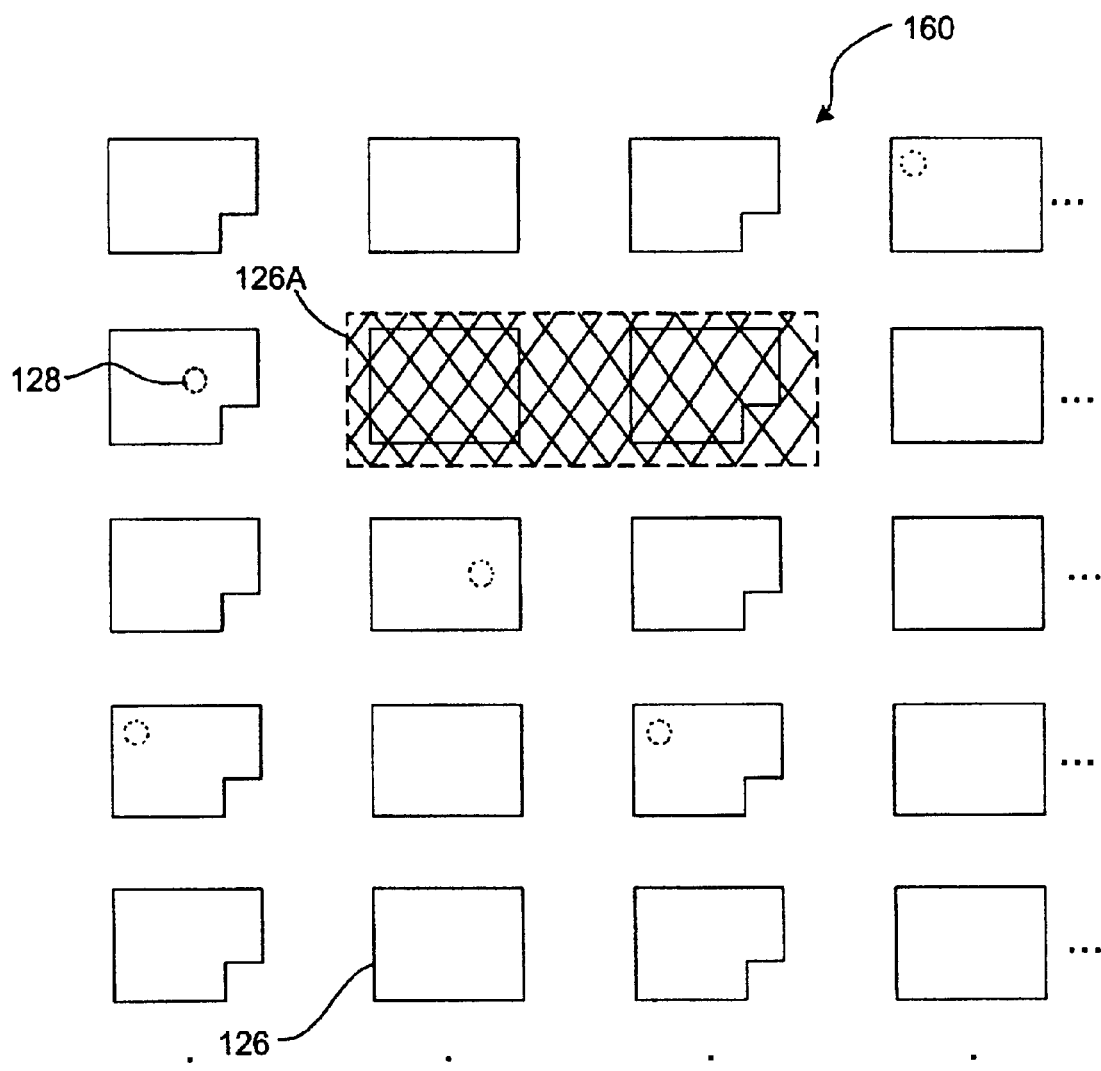
FIG. 2 illustrates a normally white LCD having a partially ablated pixel.

FIG. 2 illustrates the portion of the normally white LCD 160 having pixel 126A after partial ablation. As illustrated, pixel 126A has been altered according to the technique used in the present invention and discussed below. The ablated pixel is shown cross-hatched in FIG. 2 for clarity. Ultimately, the pixel 126A has been discolored in order to reduce its transmissivity. During this process, pixel 126A is discolored to a desired or acceptable level, which may be application specific for particular displays or for particular users of the displays. In general, red pixels and green pixels that are defective usually need discoloration more than defective blue pixels. Defective blue pixels may not need any discoloration due to their limited adverse impact on viewers.

Figure 3:
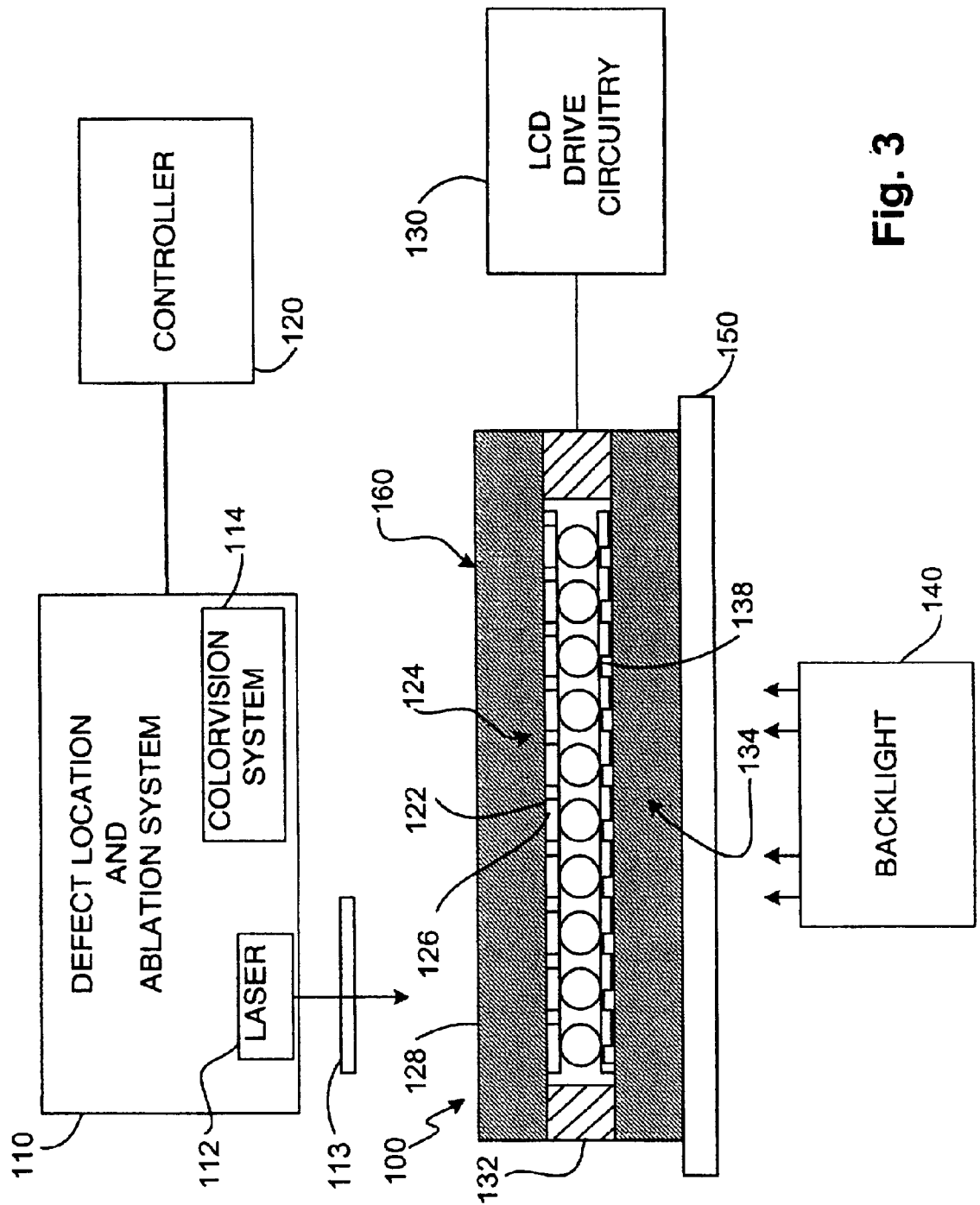
FIG. 3 illustrates a schematic diagram of an apparatus used to ablate pixels in a normally white LCD.

FIG. 3 illustrates a schematic diagram of an apparatus used to ablate pixels in a normally white LCD 160. System 100 includes defect location and ablation system 110, controller 120, LCD drive circuitry 130, backlight 140 and LCD support structure 150. LCD 160 is placed on LCD support structure 150 while performing the ablation.

LCD 160 includes color filter glass substrate 124 and thin film transistor (TFT) glass substrate 134. The glass substrates 124 and 134 can be a Corning 1737f or equivalent glass substrate manufactured by Corning, Inc. of Corning, N.Y. Color filter glass substrate 124 and TFT glass substrate 134 are separated and supported by spacer beads 128 and edge seal 132. TFT layer 138 is disposed on TFT glass substrate 134 and includes a plurality of thin film transistors as is known in the art. Color filter 122 is disposed on color filter glass substrate 124 and comprises a plurality of pixels including pixel 126. A "pixel" in accordance with the invention, can include particular portions of the color filter 122 alone, or in combination with their corresponding portions of TFT layer 138. Either definition is acceptable, in view of the fact that ablation of a pixel is accomplished by discoloring the corresponding portion of the color filter.

In order to ablate defective pixels, the following process is used. First, power is applied with LCD drive circuitry 130 to thin film transistor layer 138 of LCD 160. Backlight 140 is then used to illuminate LCD 160. Backlight 140 can be any type of light source suitable for producing light for use in backlighting LCD 160. For example, backlight 140 can include one fluorescent bulb in a serpentine configuration to facilitate the provision of a substantially even source of light over a wide area, multiple lamps, or an array of Light Emitting Diodes (LED's), if desired. As is known in the art for normally white LCDs, TFT layer 138 is adapted to work in conjunction with the liquid crystal to block light from backlight 140 when particular portions of TFT layer 138 are energized. However, a malfunction in the TFT layer 138 (particularly a single thin film transistor) can cause electrically isolated pixels, such as pixel 126A, to be defective and transmissive to light from backlight 140 at all times.

In order to locate defective pixel 126A, defect location and ablation system 110 is used. Defective pixel 126A can be located by color vision system 114 this system detects the differences in specular transmission. Color vision system 114 can be manual or automatic. Manual location may be used where an operator uses an eye piece to locate a defective pixel. In an automatic configuration, controller 120 can be used with color vision system 114 to automatically scan the LCD and locate defective pixels. In this case, color vision system 114 can be a camera equipped with automatic focus and automatic zoom to sense light transmitted from defective pixel 126A.

Once the defect is located, laser 112 can be focused to ablate the portion of color filter 122 associated with pixel 126A. Laser 112 can be a Coherent diode laser manufactured by Coherent, Inc. of Santa Clara, Calif., or any other suitable laser. In some embodiments, laser 112 operates with a 780–840 nm wavelength in the visible range. Controller 120 is adapted to move laser 112 to a proper position in order to focus on defective pixel 126. Controller 120 can be an automatic motion system, or a manually operated system, to move laser 112 in an X-Y plane which is substantially coplanar with substrate 124. When laser 112 is in the correct location, laser 112 is focused and light is generated in the visible range in order to pass through glass substrate 124 and to ablate a portion of color filter 122 corresponding to defective pixel 126A. In some applications, only the side of color filter 122 proximate the color filter substrate 124, or the substrate side of color filter 122, is darkened. The ablation is achieved by creating minimal damage to the color filter and no damage to glass substrate 124. Laser 112 is applied to color filter 122 until color filter 122 is discolored to an acceptable level. If the focusing resolution of laser 112 is significantly larger than the size of the defective pixel, laser 112 can include a mask 113 to block portions of the energy from the laser 112 in order to ablate a smaller portion of color filter 122. For example, the mask would be sized appropriate for the aperture of that particular pixel, this would allow output from laser 112 to focus on the color filter 122. This technique can then be used to locate and ablate other defective pixels on LCD 160.

Although the present invention has been described with reference to illustrative embodiments, workers skilled in the art will recognize that changes may be made in form and detail without departing from the spirit and scope of the invention.

What is claimed is:

1. A method for repairing defects in a normally white liquid crystal display, the method comprising:

applying power to the liquid crystal display;

backlighting the liquid crystal display while power is applied;

locating a defective pixel in the liquid crystal display while power is applied;

focusing a laser on a portion of a color filter corresponding to the defective pixel; and at least partially ablating the portion of the color filter corresponding to the defective pixel using the laser to discolor the color filter without damaging a glass substrate associated with the color filter.

2. The method of claim 1, wherein the step of locating further comprises locating electrically open pixels while applying power to the normally white liquid crystal display.

3. The method of claim 2, wherein the locating step comprises using a color vision system to locate the defective pixel.

4. The method of claim 1, wherein the step of ablating comprises using a controller to control the laser to ablate the portion of the color filter.

5. The method of claim 1, wherein the step of focusing further comprises focusing a laser having a wavelength in the visible range.

6. The method of claim 1, wherein the step of ablating further comprises darkening the portion of the color filter corresponding to the defective pixel, wherein the level of discoloration is set according to an original color of the defective pixel.

7. The method of claim 1, wherein the steps of locating, focusing and ablating are repeated for a plurality of defects on the liquid crystal display.

8. An apparatus for repairing defects in a normally white liquid crystal display (LCD), the apparatus comprising:

a backlight adapted to illuminate the LCD;

a power source adapted to provide power to the LCD such that non-defective pixels will block transmission of light through the LCD;

a vision system adapted to locate defective pixels while power is applied to the LCD;

a laser providing a laser light output;

a motion control system coupled to the laser and adapted to control motion of the laser; and a controller adapted to control the laser to ablate a portion of the color filter corresponding to a location of each defective pixel of the defective pixels, wherein the color filter is discolored at the location of each defective pixel.

9. The apparatus of claim 8, wherein the laser has a wavelength in the visible range.

10. The apparatus of claim 8, wherein the vision system includes a camera equipped with automatic focus and automatic zoom that scans the LCD.

11. The apparatus of claim 8, wherein the laser includes a mask to block laser light from ablating portions of the color filter associated with non-defective pixels.

12. An apparatus for repairing defects in a normally white liquid crystal display (LCD), the apparatus comprising:

pixel defect location means for identifying a location of a defective pixel; and ablation means for ablating a portion of a color filter corresponding to the location of the defective pixel, the ablation means discoloring the color filter at the location.

13. The apparatus of claim 12, wherein the means for locating uses electrically open pixels while applying power to the normally white liquid crystal display (LCD).

14. The apparatus of claim 13, wherein the means for locating uses a color vision system to locate the defective pixel.

15. The apparatus of claim 12, wherein the ablation means discolors the color filter at a different level for the color type of the defective pixel.

16. The apparatus of claim 12, wherein the ablation means only discolors a filter substrate side of the color filter.

17. The apparatus of claim 12, the ablation means darkens the portion of the color filter corresponding to the defective pixel.

18. The apparatus of claim 16, wherein the color filter is provided on a filter substrate, the filter substrate being closer to the ablation means than a TFT substrate of the LCD.

19. The apparatus of claim 12, wherein the ablation means does not damage a substrate of the color filter.

20. The apparatus of claim 12, wherein the pixel defect location means includes a camera equipped with automatic focus and automatic zoom that scans the LCD.

\* \* \* \* \*